United States Patent [19]

Akgulian

[11] 4,135,351
[45] Jan. 23, 1979

[54] ROTARY LAWN MOWER GRASS MULCHER

[75] Inventor: Sahag C. Akgulian, Racine, Wis.

[73] Assignee: Jacobsen Manufacturing Company, Racine, Wis.

[21] Appl. No.: 812,047

[22] Filed: Jul. 1, 1977

[51] Int. Cl.² ............................................. A01D 55/18
[52] U.S. Cl. ........................................ 56/255; 56/320.2
[58] Field of Search .................... 56/255, 320.2, 202, 56/501, 503, 17.4, 12.8–13.4

[56] References Cited

U.S. PATENT DOCUMENTS

| | | | |
|---|---|---|---|
| 2,659,191 | 11/1953 | Miller et al. | 56/501 X |
| 2,942,400 | 6/1960 | Sylvester | 56/255 |
| 3,043,077 | 7/1962 | Novak | 56/320.2 |
| 3,391,524 | 7/1968 | Nickoloff et al. | 56/320.2 |
| 3,531,923 | 10/1970 | DeLay | 56/255 X |

Primary Examiner—Jay N. Eskovitz
Attorney, Agent, or Firm—Arthur J. Hansmann

[57] ABSTRACT

A rotary lawn mower grass mulcher assembly having a mower housing with a discharge opening over which two plates are disposed with each plate having airholes extending therethrough and with the holes being aligned offset between the two plates. Air is permitted to escape through the holes, but grass and like debris does not have free passage through the holes, and thus the mulcher assembly causes the grass clippings to remain in the mower housing for mulching or recutting action. The two plates are assembled together, and the plates are spaced apart with one thereof toward the outer end of the housing opening being angled downwardly and outwardly, all for permitting the passage of air but deflecting any debris downward to the ground.

5 Claims, 5 Drawing Figures

U.S. Patent  Jan. 23, 1979  4,135,351
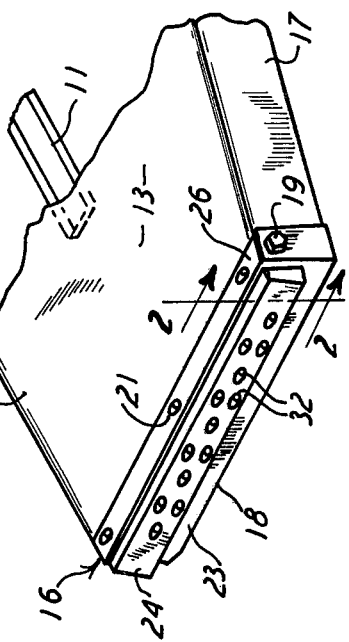
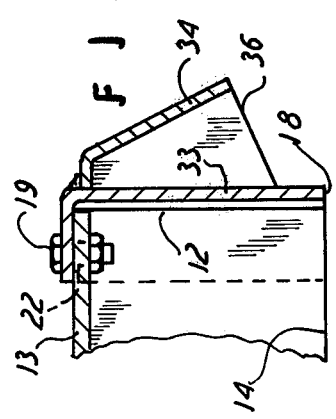
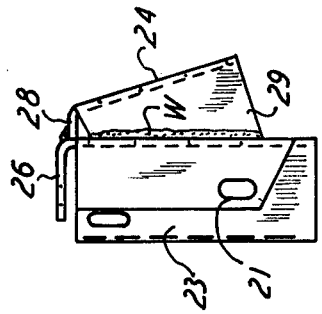
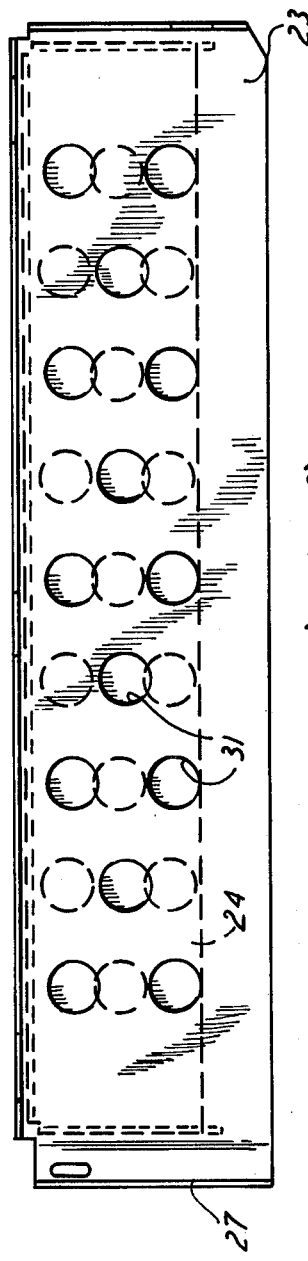
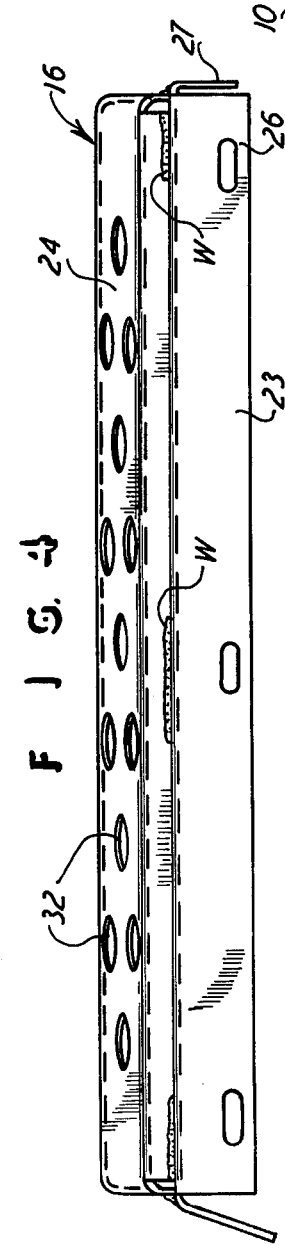

ROTARY LAWN MOWER GRASS MULCHER

This invention relates to a rotary lawn mower grass mulcher assembly, and, more particularly, it relates to an arrangement for a rotary lawn mower wherein the discharge of the grass clippings is impeded and thus clippings are retained in the housing for recutting and thus mulching action.

BACKGROUND OF THE INVENTION

The prior art is already aware of mulching types of rotary lawn mowers wherein the mower housing is essentially completely enclosed with a depending skirt portion to preclude the escape of the grass clippings and thus have the rotary cutter engage the clippings and to form them into small pieces which are ultimately deposited on the lawn and become mulch. As such, the clippings need not be discharged into a catcher or directly onto the lawn, but instead they are retained in the mower housing and are recut and processed into the mulch form and are then forced downwardly into the turf by the movement of the air created by the rotating grass cutter. Examples of prior art mowers with completely enclosed housings are found in U.S. Pat. Nos. 2,809,488 and 3,085,386 and in U.S. patent application Ser. No. 771,928 filed Feb. 25, 1977. In those examples, the mower housing is not provided with any lateral air or grass outlet opening, and the air is simply confined for constant turbulence and churning and can escape only downwardly from the mower housing itself.

Prior art examples of mowers having lateral discharges which are not completely open but which have housing portions extending across the discharge for intercepting debris or the like, or which have housing portions extending downwardly from the mower housing skirt itself while permitting some passage of air and grass therepast are found in U.S. Pat. Nos. 2,557,598 and 2,659,191 and 2,718,739 and 2,719,396 and 2,860,474. Of the aforementined, U.S. Pat. Nos. 2,659,191 and 2,718,739 are the most pertinent with regard to the present invention, but those two patents only show a perforated plate extending spaced from the tip of the rotary mower blade for the passage of air and clippings through the holes in the perforated plate. That is, the arrangement in those two patents is simply that of having a perforated plate which tends to impede the full flow of air from the mower housing but which still permits the grass clippings to go through the apertures or holes in the plate, much in the same manner that they would pass through an opening or regular discharge in a rotary mower housing. In addition to having the grass clippings pass through the apertures of the single plate shown in those two patents, the clippings or any debris or the like can be thrown or blown in a direct path through one of the openings, and thus the clippings or debris is widely scattered and there is some danger in a mower with that arrangement.

Accordingly, the present invention provides an improvement upon the mulching type of mowers, and it particularly provides an arrangement for a mulcher assembly which can be disposed over the outlet of a mower housing and thus confine the air and clippings and debris within the housing for the purpose of mulching same and then having it deposit downwardly below the housing itself, rather than have it below through the discharge opening or through any holes or the like in the mulcher assembly. Specifically, the present invention arranged the mulcher assembly with two spaced-apart plates which have apertures or holes in a staggered pattern between the two plates so that no grass or debris can move directly from the housing and past the plates and exteriorly of the mower, but all debris which is blown or thrown from the mower will be encountered by the mulcher plates, and only the air itself can fully escape beyond the mulcher plates. As such, the present invention provides an efficient and safe arrangement for a mulcher plate which can be attached to the mower housing and across the discharge opening thereof.

Still further, the present invention provides an arrangement for a rotary lawn mower wherein a mulcher assembly can be readily attached to or removed from the mower housing, and the assembly can be ready and easily provided by means of stamping and bending of the plates comprising the assembly, and the plates can be affixed together in an assembly wherein the two plates preclude the direct movement or escape of the debris from the mower housing, and thus a mulching action is achieved by the mower.

In accomplishing the aforementioned, the mulcher assembly of this invention provides a means for the escape of air from the mower housing, while precluding the escape of the grass or debris which is to be mulched, such as leaves or the like, and the escape of some of the air provides for a most efficient mulching action created by the air and debris remaining within the housing while the excess or at least some of the air created by the rotating cutter blade can escape and does escape through the mulcher assembly to insure the efficient action of the air and debris remaining in the housing.

Other objects and advantages will become apparent upon reading the following description in light of the accompanying drawings.

BRIEF DESCRIPTION OF THE DRAWINGS

FIG. 1 is a perspective view of a fragment of a mower housing with the mulcher assembly attached thereto.

FIG. 2 is an enlarged sectional view taken along the line 2—2 of FIG. 1.

FIGS. 3, 4, and 5 are front, top, and end views, respectively, of the mulcher assembly shown in FIG. 1.

DETAILED DESCRIPTION OF THE PREFERRED EMBODIMENT

FIGS. 1 and 2 show a mower housing portion 10 and a conventional rotary cutter bar 11 which would be suitably rotatably mounted and powered for rotation to cut the grass and to create a draft of air directed through the portion 10 and normally through the outlet or opening 12 shown in FIG. 2. Thus, the housing 10 has an upper deck wall or portion 13, and it terminates in a lower edge 14 and the mower is completely open around the lower edge 14 so that grass and air can fall below the housing 10 and onto the turf in the mulching action. Thus, the mower can be of a conventional arrangement with the confining mower housing and the rotary blade therein, and it may actually be made according to the showings in U.S. Pat. Nos. 2,659,191; 2,718,739; 2,900,660; 3,112,596 or 3,980,068, and those showings can be considered as part of the disclosure herein and they depict a mower and having a discharge chute which would either be extended from or connected to the housing portion 10, and that would actually be in place of the mulcher assembly 16 which is shown herein and which is connected to the housing 10 to extend over the discharge opening 12.

Thus, the mulcher assembly 16 is removably attached to the mower housing 10 to extend over the discharge opening 12 and to thus intercept the otherwise flow of grass clippings and debris moving through the housing 10 and out the opening 12. Therefore, the mulcher assembly 16 has a height which is the same as the height of the mower housing skirt 17, and thus the assembly 16 has its lower edge 18 terminating on the horizontal plane with the mower skirt edge 14, as they are shown in FIG. 2. As such, the mulcher assembly is co-extensive with the mower outlet opening 12, and it can be attached to or removed from the housing 10, such as by means of the bolts 19 which extend through the bolt holes 21 in the assembly 16 and through the aligned holes, such as the hole 22, in the housing 10.

The drawings further show that the assembly 16 is made substantially from two plates 23 and 24, and both plates can be made from a flat plate stock and stamped to have the plates provided with inturned ends, such as the ends 26 and 27 on the plate 23 and the ends 28 and 29 on the plate 24. Further, the plates have apertures or holes 31 and 32, respectively, and the holes are shown positioned in certain patterns on each of the two plates, such as the pattern shown for the holes 31 on plate 23 in FIG. 3, and the showing of course being in solid lines, and the showing of the holes 32 on the plate 24 in FIGS. 1, 3, and 4.

The, the plates 23 and 24 are substantially planar plates which are spaced apart with the plate 23 having an uprightly disposed main portion 33 extending transverse to the axis of the discharge opening 12 and fully thereacross, as shown in FIG. 2. Of course the plate inturned ends 26 and 27 provide the mounting portions of the plate 23, as clearly shown in FIG. 1. The plate 24 is disposed at an angle relative to the portion 33 of the plate 23, and the angle is such that the plate 24 has its portion 34 extending downwardly and outwardly, relative to the outlet opening 12 and relative to the vertical or upright plane of the portion 33 of the plate 23. Thus, the plate 24 has a lower edge 36 which forms a continuous edge with the plate portion 23, and air or the like can move through the apertures 31 in the plate 23 and then pass the lower edge 36 of the plate 24 and through the apertures or holes 32 in the plate 24. However, it will be seen and understood that the apertures 31 and 32 are staggered or offset relative to their central or longitudinal axes, as clearly shown in FIG. 3, and thus no debris or even any air can move directly along a straight line through the opening 12 and past both the mulcher plates 23 and 24. Instead, the air is deflected and retarded in its flow, and all debris and grass clippings and the like are also deflected and cannot move in a straight path, and thus the retarding of the flow will create the necessary condition within the housing 10 for the mulching action and also the debris cannot be thrown directly from the mower housing 10.

The plates 23 and 24 form an assembly and are attached together, such as by means of the weldments W which can be spaced along the abutting edges of the respective plates 23 and 24. With the assembly of the mulcher plates as shown and described herein, the air will be deflected downwardly and the mulcher assembly also retricts the exhaust of the air so that the proper mulching action will take place within the mower 10.

Accordingly, the arrangement of the mulcher assembly is such that there are two spaced-apart plates with air passageways or holes therethrough and with the passageways or holes being offset on the respective said plates so that no air or debris can flow directly in a straight path from the housing 10, and the two plates are arranged in a manner so that they can be attached relative to or directly to the housing 10, and the particular showing herein is to have one of the plates 24 attached, such as by the welding described and shown, to the other plate 23 so that there is an assembly of the two plates 23 and 24. Further, the mulcher assembly 16 is attached exteriorly of the housing 10 and thus is readily positioned and removed therefrom so that the mower can be converted between a mower with a discharge opening and a mower with a mulching action, all as described herein with respect to the present drawings and with reference to the aforesaid prior patents. Accordingly, on the aforesaid or standard and conventional type of mower, the usual grass deflector which is in the form of an inverted U-shaped piece (such as piece 14 shown is U.S. Pat. No. 3,243,196) attached to the mower 10 and in place of the mulcher assembly 16 can be removed from the mower 10 and the assembly 16 can be placed thereat, all for converting the mower to the mulcher type of mower, when desired.

What is claimed is:

1. A rotary lawn mower grass mulcher comprising a mower housing having a grass outlet through which the cut grass is discharged, a grass mulcher assembly removably attached to said housing and extending across said grass outlet and including a first and a second mulcher plate, said assembly including a first mulcher plate extending across said outlet for initially blocking the discharge of cut grass and having a plurality of holes extending therethrough for the passage of air from said housing, and said assembly including a second mulcher plate attached to said first mulcher plate and extending spaced therefrom and having holes extending therethrough in positions with the axes therof offset from the axes of said holes of said first mulcher plate for further and secondarily blocking the discharge of any cut grass coming through said first mulcher plate while having air pass from said housing and through said holes in said second mulcher plate, and with said mulcher plates thereby retaining said cut grass in said housing for mulching the cut grass, said second mulcher plate having inturned ends which present edges in contact with said first mulcher plate at all of the edges of said second mulcher plate except the lower edge thereof.

2. The rotary lawn mower grass mulcher as claimed in claim 1, wherein said second mulcher plate extends spaced from said first mulcher plate at an angle thereto, for disposing said holes in said plates with the respective axes of said holes at different angles.

3. The rotary lawn mower grass mulcher as claimed in claim 2, wherein the angle between said plates is such that at least one of said plates is angled outwardly from its upper portion and relative to the direction of the discharge from said housing.

4. The rotary lawn mower grass mulcher as claimed in claim 1, wherein said first plate is disposed in an upright plane across said opening, and said second plate is disposed angled down and outwardly relative to the direction of the discharge from said housing.

5. The rotary lawn mower grass mulcher as claimed in claim 1, wherein said first plate is disposed in an upright plane across said outlet, and said second plate is multi-sided with one side thereof disposed angled down and outwardly relative to the direction of the discharge from said housing, and the other of the sides of said second plate being angled toward and into contact with said first plate, and removable fasteners for removably connecting said assembly to said housing.

* * * * *